Jan. 19, 1954
E. O. CODIER
2,666,512
CRYSTAL CONTROLLED CLUTCH
Filed Nov. 27, 1950
2 Sheets-Sheet 1
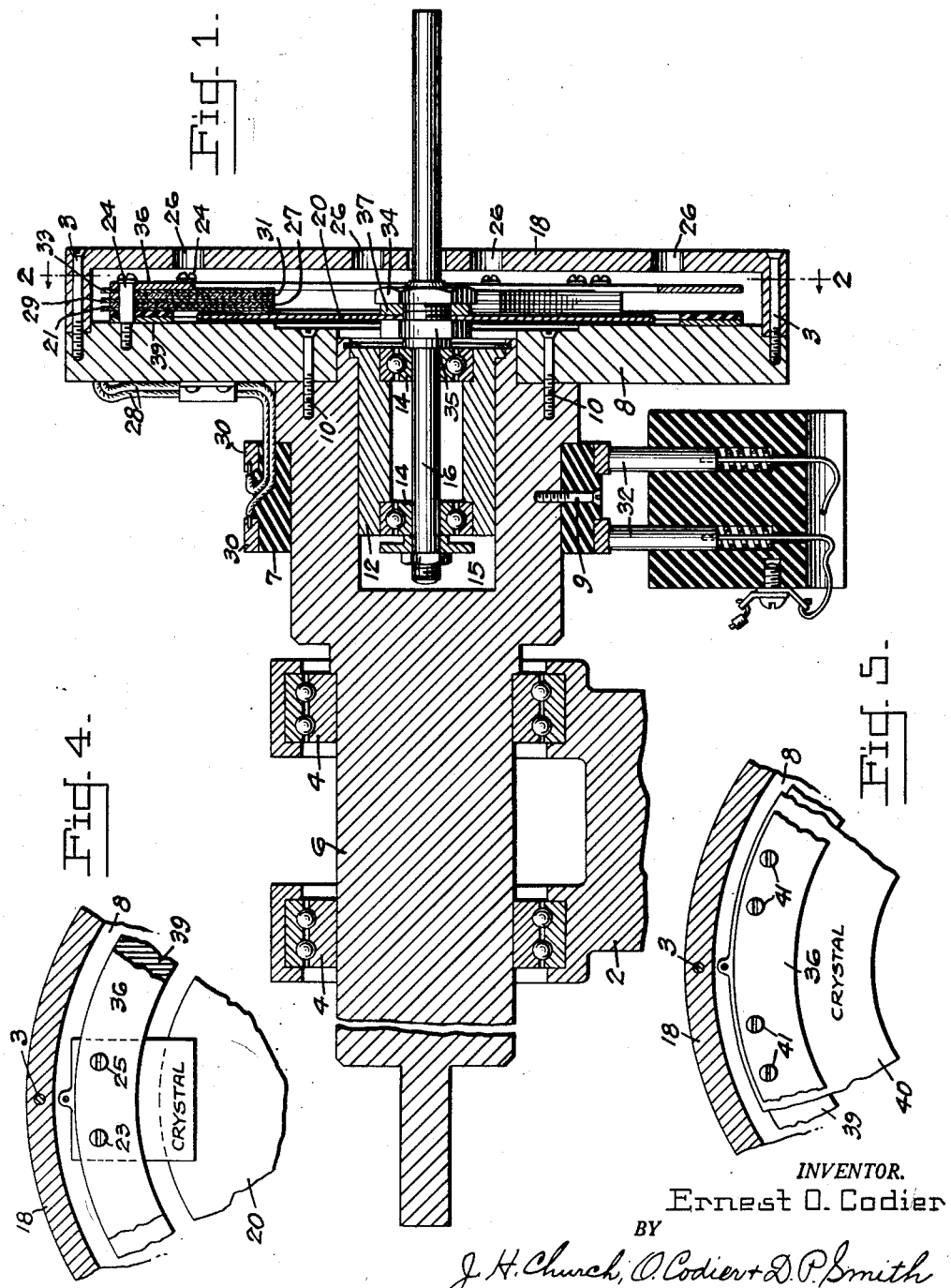
INVENTOR.
Ernest O. Codier
BY
J. H. Church, O. Codier + D. P. Smith
ATTORNEYS AND AGENT

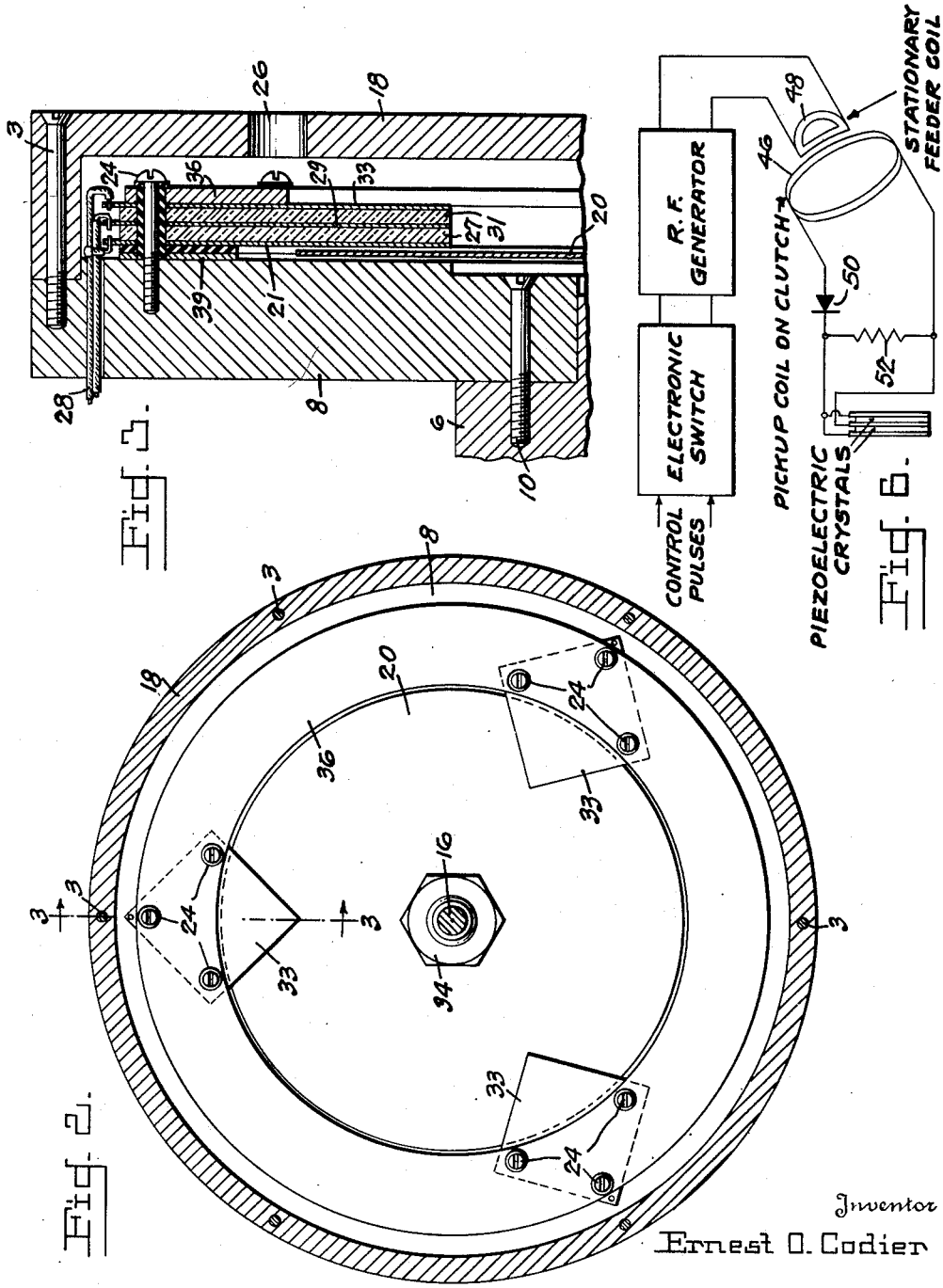

Patented Jan. 19, 1954

2,666,512

UNITED STATES PATENT OFFICE 2,666,512

CRYSTAL CONTROLLED CLUTCH

Ernest O. Codier, Takoma Park, Md., assignor to the United States of America as represented by the Secretary of the Army Application November 27, 1950, Serial No. 197,815

13 Claims. (Cl. 192—82)

(Granted under Title 35, U. S. Code (1952), sec. 266)

The invention described herein may be manufactured and used by or for the Government for governmental purposes without the payment of any royalty thereon.

The invention forming the subject matter of this application relates to torque applying devices. More specifically the invention relates to a device for forming a drive connection between two independently rotatable elements, said device having for one of its objects to provide a non-slip connection between said elements.

The primary importance in the operating means of my connecting or clutching device is assigned to high speed of clutching action in response to an actuating signal, hence a high degree of utility of the device is expected in the tape and wire transport mechanisms for electronic computers. It will, however, be understood that my invention has application to any service whatsoever wherein an electrically operated clutch with practically instantaneous response is useful.

It is therefore a broad object of my invention to provide a high speed electrically operated clutch.

It is a further object of my invention to provide an electrically operated clutch having negligible inductance in the actuating circuit.

It is a still further object of my invention to provide an electrically operated clutch whose steady state operation is not dependent upon current flow.

It is yet another object of my invention to provide an electrically operated clutch which is dependent for operation upon the piezoelectric effect.

Other objects and advantages will be apparent from the following description.

In electronic digital computers it is desirable that tape transport mechanisms be provided with clutches which operate virtually instantaneously, which are readily controlled by electrical or electronic means, and which require extremely low operating current. To this end my invention contemplates a clutch which utilizes the contortion which takes place in a piezoelectric crystal when a voltage is applied thereto.

The manner in which my clutch is constructed and operated will be apparent to those skilled in the art from reference to the following figures and description in which:

Fig. 1 is a longitudinal section of one embodiment of my clutch.

Fig. 2 is a section view taken on lines 2—2 of Fig. 1.

Fig. 3 is an enlarged sectional detail taken on lines 3—3 of Fig. 2.

Fig. 4 is a fragmental sectional detail of Fig. 2 showing a modification thereof.

Fig. 5 is a fragmental sectional detail of Fig. 2 showing another modification thereof.

Fig. 6 is a schematic wiring diagram of a further modification of my invention.

Referring now to Fig. 1, suitable bearings 4 in a standard 2 rotatably support a cylindrical driving member 6 which is provided with a coupling (not shown) to a motor or other rotating machine. Rigidly affixed to member 6 by screws 9 and rotatable therewith is an annular insulating member 7 which mounts slip rings 30. The rings are connected by means of brushes 32 to any suitable source of electrical energy. Rigidly attached to cylindrical driving member 6 by screws 10 and rotatable therewith is mounting plate 8. A cylindrical cavity 15 in driving member 6 receives member 12 adapted to mount bearings 14 which rotatably support driven member 16. Rigidly mounted on member 16 and clamped thereto between boss 35 and washer 37 by lock nut 34 is engaging disc 20. Disc 20, best seen in Fig. 2 comprises a smooth, flat, relatively thin plate of metal of uniform thickness rotatable in a vertical plane between the outer or bounding plane of mounting plate 8 and the plane of crystal electrode 21.

The crystals used in my invention in the reduction to practice were the "Bimorph" (registered trade-mark of the Brush Development Company) type of crystal sandwich which will bend or twist upon the application of voltage.

The crystal sandwich is one inch square and approximately 0.1 inch in thickness. It comprises a friction plate and electrode 21, crystal wafer 27, electrode 29, crystal wafer 31 and electrode 33 and is attached to mounting plate 8 by screws 24 piercing pressure plate 36 and passing through spacer ring 39. The piezoelectric structure and disc are protected by cover plate 18 having therein holes 26 for ventilation and secured to mounting plate 8 by screws 3.

In Fig. 2 three crystals are shown equally spaced around the periphery of mounting plate 8 in the interest of dynamic balance and clarity of illustration. It will be understood however that my invention broadly contemplates all possible arrangements of crystals as to positioning and number thereof.

In the type of mounting of the crystal shown in Fig. 2 three points of support are provided by screws 24 at each of three corners of the crystal, the fourth corner being left free to move. This type of mounting of the crystal is known to those skilled in the art as a "Twister" and the unrestrained corner will move from the plane defined by the restrained corners. Thus under conditions of contortion the smallest mass of crystal is located at the greatest radius or point of displacement from the center point of the crystal.

It can be readily seen that upon application of D. C. voltage to the electrodes of the crystals through slip rings 30 and leads 28 the free ends of the crystals will move and pinch disc 20 between plates 8 and 21 with a force depending upon the constants of the system and thereby cause the disc and plate to rotate together.

It has been found that the time delay between application of electrical excitation and the appearance of useful torque at the output shaft in one model of my invention was approximately 200 microseconds.

The speed of response of my clutch is dependent upon several factors:

1. The inertia of the output system, and the torque available which is in turn dependent upon the force exerted by the crystals and the radius at which it is exerted. Once the crystals have reached the limit of their travel, increasing the exciting voltage will increase the force exerted by them. In my clutch the torque developed by three crystals as shown in Fig. 2 (Brush Development Company Torque "Twister" Bimorph 2F97. Rochelle Salt) is 16.5 ounce-inches at 400 volts, and is 21 ounce-inches at 500 volts where the crystals are mounted in such a manner that their pressure is exerted at a radius of an inch and one-half.

2. The crystal mounting, insofar as it affects the distance which the crystal pressure point must move before it begins to pinch the output drive disc. In this connection it is important that the crystals be flat on their upper and lower surfaces since this facilitates precise positioning of the crystals with respect to the disc.

3. The resonant frequency of the crystal itself. This is the factor which, together with the total displacement required, forms the ultimate limit for the frequency response. If a step input function is applied to any crystal the physical displacement of the crystal plotted against time appears as a sine wave whose frequency is the resonant frequency of the crystal and whose amplitude is that displacement which will be caused by the voltage applied.

The resonant frequency of a Rochelle salt twister "Bimorph" is $$F = 26 \ (T/LW) \ \text{kilocycles}$$

and the sensitivity of the same "Bimorph" in thousandths of an inch per kilowatt is $$S = 0.08 \ (LW/T^2) \ \text{mils/KV}$$

in which L, W, and T are the length, width and thickness, respectively (in inches) of the "Bimorph." It is seen from these equations that the combined requirements of high resonant frequency and high sensitivity result in physical dimensions which become prohibitively small if these requirements are not kept within judicious limits. However, since the sinusoidal shape of the displacement v time curve yields one-half of the peak displacement in only one-third of the time required for peak displacement, it follows that if the voltage applied to the crystal be made to be such as to tend to displace the crystal twice as far as actually needed the required motion will occur in only one-third the time it would have if the voltage had been correct for the displacement required. This excess voltage in addition increases the pinching force in the displaced position giving a two fold advantage to the use of higher voltages.

4. External mechanical loading of the crystal, such as the pressure plate 36 in my clutch, serves to increase the effective inertia of the crystal and thus to lower its resonant frequency.

The modification shown in Fig. 4 is illustrative of the method of mounting or fastening the crystals with two screws 23 and 25 whereby the piezoelectric crystal contorts upon application of voltage thereto and the contact with and pinching of disc 20 occurs along the entire unrestrained edge of the crystal. This type of mounting is known to those skilled in the art as a "bender" and the points of maximum radius or displacement from the plane of the crystal are equally displaced from the center point of the crystal.

Fig. 5 shows a further modification of the invention wherein the piezoelectric crystal comprises a continuous disc 40 clamped by screws 41 between pressure plate 36 and mounting plate spacer ring 39. The continuous disc has its outer periphery restrained as aforesaid and will bend or contort along its inner periphery upon application of voltage thereto, thereby engaging and pinching the driven disc and causing the driving and driven members to rotate together.

Fig. 6 shows my clutch in its application to a wireless system whereby the sliding connections or slip rings are eliminated. The piezoelectric crystals may be connected as shown to a rotating pickup 46 mounted on any suitable part of the driving member through a rectifier 50 similarly mounted. A stationary feeder coil 48 located near the pick up coil is fed by an R. F. generator which is switched off and on by an electronic switch. The R. F. energy induced in the pickup 46 is rectified and a D. C. voltage is thus applied to the crystal structure. A resistor 52 is placed in shunt with the crystal electrodes which permits the charge to leak off when excitation is removed.

My clutch in any of its forms may be operated in such a manner that complete disengagement of the piezoelectric crystal from the disc occurs only when the crystal is excited negatively (causing the crystal to bend backwards).

Rochelle salt crystals are used in the illustrative clutch because of their sensitivity. Rochelle salt however imposes rather severe mechanical limitations in that it is easily fractured and will deliquesce if not protected from excess humidity. Barium titanate crystal should yield good results in a clutch application where the high mechanical strength will compensate for the lower sensitivity.

It will be seen that I have provided a voltage actuated clutch having a high speed of action in response to an actuating signal, having negligible inductance in the actuating circuit whereby inductive lag effects on an actuating signal are negated, and which is readily adapted to electronic control. In relatively small clutches wherein high speed of response and electronic control are essential potential operated devices are easily adapted to the ordinary sized electronic components.

Various modifications may be made in this invention without departing from the spirit thereof or the scope of the claims and therefore the exact forms shown are to be taken as illustrative only and not in a limiting sense; and it is desired that only such limitations shall be placed thereon as are set forth in the accompanying claims.

I claim:
1. A force transmitting device comprising a rotatable driving member, a rotatable driven member, piezoelectric means including fastening means rotatable with said driving member, disc means rotatable with said driven member closely spaced from said piezoelectric means and means for applying a voltage to the said piezoelectric means whereby the said piezoelectric means contorts from a normal position and engages the said disc means and the said driving member and the said driven member rotate together.

2. The invention as set forth in claim 1 wherein the said piezoelectric means comprises at least one crystal having a portion thereof free to move.

3. The invention as set forth in claim 1 wherein the said piezoelectric means comprises at least one parallelepipedous crystal, one corner of which is free to move.

4. The invention as set forth in claim 1 wherein the said piezoelectric means comprises at least one parallelepipedous crystal and the said fastening means pierce two parallel sides in a plane close to one edge thereof whereby the remaining edge is free to move.

5. The invention as set forth in claim 1 wherein the said piezoelectric means comprises a continuous disc crystal.

6. The invention as set forth in claim 1 wherein the said piezoelectric means comprises at least one crystal having a portion thereof free to move and the said means for applying a voltage to the said piezoelectric means comprises slip rings and brushes.

7. The invention as set forth in claim 1 wherein the said piezoelectric means comprises at least one crystal having a portion thereof free to move and the said means for applying a voltage to the said piezoelectric means comprises a rotatable pick up coil, a closely spaced stationary feeder coil and a rectifier.

8. A force transmitting device comprising a driving member supported for continuous rotation in a selected direction, a closely spaced adjacent relatively rotatable driven member supported for continuous rotation in a selected direction, a piezoelectric member fixed to said driving member and rotatable therewith, and means for applying a voltage to the said piezoelectric member to distort the same from a normal position to engage the said driven member whereby the said driving member and the said driven member are urged into engagement to rotate together.

9. A clutch comprising in combination a driving member supported for continuous rotation in a selected direction, a driven member supported for continuous rotation in a selected direction and disposed adjacent said driving member, a piezoelectric member fixed to said driving member and rotatable therewith, and means for applying a voltage to the said piezoelectric member to distort the same from a normal position to engage the said driven member whereby the said driving member and the said driven member rotate together.

10. The invention as set out in claim 9 wherein the said piezoelectric member comprises at least one parallelepipedous crystal one corner of which is free to move.

11. A clutch comprising in combination a rotatable driving member, a rotatable driven member, a plurality of piezoelectric crystals mounted on said driving member with one corner thereof free to move whereby the said driven member is sandwiched in part at least between the said driving member and the said one corner, and means to apply a voltage to said piezoelectric crystals whereby to distort the same from a normal position to lock the said driven member to the said driving member for rotation together.

12. A clutch comprising in combination a driving member and a driven member, piezoelectric means secured to one of said members to cause a driving engagement between the said members, and means connected to said piezoelectric means to apply a voltage thereto.

13. A clutch comprising in combination a driving member and a driven member, piezoelectric means secured to said driving member and distortable from a normal position upon application of a voltage thereto to cause a driving engagement between the said members, and means connected to said piezoelectric means to apply a voltage thereto.

ERNEST O. CODIER.

References Cited in the file of this patent

UNITED STATES PATENTS

| Number | Name | Date |
|---|---|---|
| 1,564,938 | Chandeysson | Dec. 8, 1925 |
| 1,631,470 | Chase | June 7, 1927 |
| 1,820,035 | Stokes | Aug. 25, 1931 |
| 1,966,446 | Hayes | July 17, 1934 |
| 1,995,270 | Wallace | Mar. 19, 1935 |
| 2,005,468 | Modine | June 18, 1935 |
| 2,033,631 | Gruetzmacher | Mar. 10, 1936 |
| 2,207,539 | Gravley | July 9, 1940 |
| 2,347,200 | Lehde | Apr. 25, 1944 |
| 2,365,738 | Williams | Dec. 26, 1944 |
| 2,540,851 | Wiggins et al. | Feb. 6, 1951 |